Jan. 23, 1951          C. H. O. BERG          2,539,006

ADSORPTION APPARATUS AND PROCESS

Filed April 30, 1949

INVENTOR.
CLYDE H. O. BERG
BY
ATTORNEY.

Patented Jan. 23, 1951

2,539,006

UNITED STATES PATENT OFFICE 2,539,006

ADSORPTION APPARATUS AND PROCESS

Clyde H. O. Berg, Long Beach, Calif., assignor to Union Oil Company of California, Los Angeles, Calif., a corporation of California Application April 30, 1949, Serial No. 90,710

28 Claims. (Cl. 183—4.2)

This invention relates to a process and apparatus for the continuous separation of normally gaseous mixtures into a plurality of substantially pure fractions through selective adsorption of such mixtures on substantially compact moving beds of solid granular adsorbents. This invention further relates more specifically to an improved selective adsorption process wherein the moving bed of solid adsorbent is passed through a substantially vertical column successively through zones of desorption, heating, sealing, and cooling, and subsequently through a separation zone wherein the feed gas is contacted with the adsorbent and separation into fractions occurs. The adsorbent removed from the separation zone is subjected to further rectification and is then removed from the bottom of the column and conveyed to the top thereof for recirculation through the aforementioned zones. This conveyance of adsorbent is accomplished in the presence of a lift gas which comprises a part of the most readily adsorbable constituents present in the gaseous mixture and numerous advantages result from this improvement.

Applications, Serial Numbers 90,708 and 90,709 disclose related subject matter.

It is an object of the present invention to provide an improved selective adsorption process in which the adsorbent removed from the bottom of the column is saturated with the most readily adsorbable constituents of the gaseous mixture and is conveyed by means of such constituents as a lift gas to the top of the column.

It is also an object of this invention to provide an improved method for conveying the adsorbent from the bottom to the top of the column by means of a lift gas consisting essentially of a mixture of rich gas and of stripping gas.

An additional object of this invention is to improve the selective adsorption process by reducing the quantity of lift gas required by employing as a lift gas a fraction of the higher molecular weight or more readily adsorbable constituents of the gaseous mixture.

It is another object of the present invention to provide in the selective adsorption process a method whereby adsorbed constituents are desorbed from the rich adsorbent and part of the thus recovered constituents employed as a high viscosity-high density lift gas for the conveyance of cool rich adsorbent in the process.

It is a further object of this invention to provide an apparatus adapted to accomplishing the foregoing objects.

Other objects and advantages of this invention will become apparent to those skilled in the art as the description thereof proceeds.

Briefly, this invention comprises an improved selective adsorption process in which a substantially compact moving bed of solid granular adsorbent flows by gravity downwardly through successive zones of preferential desorption, heating, sealing, and cooling, and through a separation zone as it is passed through the adsorption column. The adsorbent is withdrawn from a point below the separation zone and the cool rich adsorbent, saturated with the most readily adsorbable constituents of the feed gas mixture, is contacted with a cool lift gas containing the same constituents. This rich adsorbent is conveyed thereby to the top of the column where the adsorbed constituents are desorbed in the preferential desorption zone. The separation zone mentioned above may be modified considerably to contain one or more adsorption and rectification zones whereby two or three or more different product gases may be produced or where one or two different feed gases may be separated simultaneously. The principal improvement in this present invention resides in the placing of the separation zone at the bottom of the column or more particularly in inserting the adsorbent conveyance step in the process immediately following the separation step. In this manner adsorbent saturated with more readily adsorbable constituents may be effectively transported without deleterious effect upon the adsorbed phase with a lift gas consisting essentially of constituents which are most readily adsorbed. In this way the greatest quantity of adsorbent may be circulated for the smallest quantity of lift gas without bringing into the process separate lift gases comprising constituents not found in the gaseous mixtures being separated. This is the principal advantage or characteristic of the present invention.

The gaseous mixture to be separated is introduced into the separation zone where the adsorbent is enriched with the more readily adsorbable constituents of the gaseous mixture forming a rich adsorbent which passes through a primary rectification zone. Herein it is contacted with a portion of a rich gas reflux which is also employed as the lift gas to form a rectified adsorbent. This adsorbent passes from the bottom of the column where it is contacted by a rich gas lift medium and is introduced thereby into the preferential desorption zone situated at the top of the column. Herein the preferential adsorption of a stripping gas causes desorption of these constituents from the adsorbent to form a rich gas product a portion of which is used as the rich gas. The partially stripped adsorbent thus formed passes downwardly through the heating zone wherein the adsorbent temperature is raised and the adsorbent is countercurrently contacted with further quantities of stripping gas introduced at a point below the heating zone. The hot lean adsorbent passes from the heating zone through a sealing gas removal zone concurrently with part of the stripping gas and then into an indirect cooling zone. The purge gas, comprising a fraction of the lean gas product and containing the least readily adsorbable constituents of the gaseous mixture, passes upwardly through the cooling zone countercurrent to the downwardly flowing lean adsorbent therein. This purge gas serves to remove traces of stripping gas adsorbed on the adsorbent and also to prevent that portion of the stripping gas entering the sealing gas removal zone from passing into the cooling zone wherein it would rapidly be adsorbed and condensed thereby seriously effecting the adsorbent flow characteristics. A mixture of stripping gas and purge gas is formed in the sealing gas removal zone and this seal gas is removed therefrom at such a rate as to maintain a pressure within the seal gas removal zone which is somewhat less than either pressure existing in the heating and cooling zones. By this method the stripping gas present in the heating zone is prevented from deleteriously affecting the adsorbent flow characteristics in the cooling zone and the purge gas passing through the cooling zone is prevented from entering and contaminating the rich gas product removed from the heating zone.

The effective sealing of the gases in the heating zone from those in the cooling zone is one of the principal advantages of the present invention. The circulation of the adsorbent through the process by means of a lift gas consisting of those constituents which are last to be desorbed at the highest temperature of the adsorbent is another advantage of the process. A third advantage of the process exists in the conveyance of adsorbent which is at a moderate temperature of the order of 100° F. to 200° F. and the recirculation of a lift gas of considerably increased density and viscosity and consequently greater suspending powers for the adsorbent, and the simplification of blowing apparatus required for recirculation of low temperature lift gas in the system. There are other advantages that will become apparent to those skilled in this art as the description and illustration of the present invention further proceeds.

To facilitate illustration of the present invention and the description of the process and apparatus thereof a drawing is included in which a combination schematic flow diagram of the improved selective adsorption process and a vertical cross section elevation of the improved selective adsorption column is shown.

Figure 1:
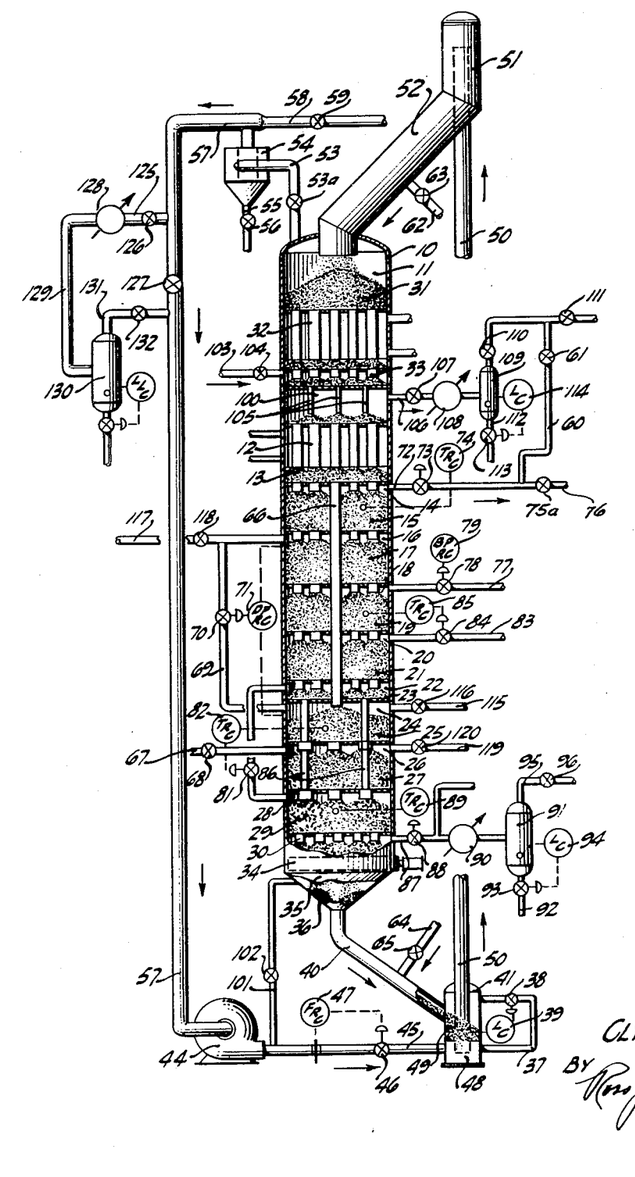

Referring now more particularly to the drawing, selective adsorption column 10 is provided at successively lower levels therein with elutriation zone 11, preferential desorption or steaming zone 31, indirect heating zone or stripper 32, stripping gas engaging zone 33, seal gas removal zone 100, indirect cooler 12, zone 13, lean gas disengaging zone 14, secondary adsorption zone 15, secondary feed gas engaging zone 16, first side cut rectification zone 17, first side cut gas disengaging zone 18, second side cut rectification zone 19 which may be also termed "first side cut desorption zone 19," second side cut disengaging zone 20, second side cut desorption zone 21, primary reflux gas engaging zone 22, column divider 23, secondary feed disengaging zone 24, primary adsorption zone 25, feed gas engaging zone 26, primary rectification zone 27, primary reflux gas disengaging zone 28, secondary rectification zone 29, rich gas disengaging zone 30, feeder zone 34 and bottom zone 35. That portion of column 10 included between zone 13 and rich gas disengaging zone 30 may be termed the separation zone in which the modification shown in the drawing is one of several to be subsequently described. That part of the separation zone between zone 13 and column divider 23 is known as a side cut gas zone or the secondary separation zone while the remaining part of the separation zone between column divider 23 and disengaging zone 30 is known as a feed gas zone or primary separation zone in the modification shown. In the separation zone shown on the drawing, two separate and individual streams of granular adsorbent are employed, one each passing through the primary and secondary separation zones. The adsorbent passing from zone 13 is divided into these two streams which are subsequently combined as they pass through zone 28 into secondary rectification zone 29. From this point the adsorbent is conveyed to the top of the column where it is heated to effect desorption of the rich gas, passed through a sealing zone from which a seal gas is removed, then passed through a cooling zone to form a cool lean adsorbent which is then passed directly into the separation zone.

In bottom zone 35 an accumulation of adsorbent 36 is maintained by the cooperative action of level control 39 and control valve 38 whereby transfer line 40 is maintained full of flowing adsorbent. In another modification transfer line 40 may be maintained only partially full of flowing adsorbent so that part of the lift gas may pass directly from zone 41 into bottom zone 35. Level control 39 may also be situated in bottom zone 35. The adsorbent passes from accumulation 36 via transfer line 40 into induction zone 41. A lift gas is introduced under pressure exerted by lift gas blower 44 via line 45 controlled by valve 46 under the action of flow recorder controller 47 into lift gas inlet zone 48 of induction zone 41. The lift gas passes upwardly through solids inlet zone 49, picking up the adsorbent, forming a suspension and passes via lift line 50 into impactless separator 51. Herein the adsorbent suspension is broken and the adsorbent and lift gas pass as substantially independent phases through transfer line 52 to collect in the upper portion of column 10. The lift gas passes from column 10 via line 53 controlled by valve 53a into separator 54 wherein suspended adsorbent fines elutriated from the adsorbent in zone 11 are separated to be removed via line 55 controlled by valve 56. The fines-free lift gas then passes via lift gas return line 57 to the suction inlet of blower 44 for recirculation. Accumulations of lift gas in this cycle may be withdrawn continuously via line 58 controlled by valve 59 into rich gas product line 87. Preferably, this gas is combined with the rich gas product by passing it through line 101 controlled by valve 102 through feeder zone 34 and an additional quantity of adsorbent into rich gas disengaging zone 30.

Provision is made in the present process for the removal of stripping gas, which usually comprises steam, from the recirculating lift gas stream wherein rich gas alone is desired for a lifting medium. To accomplish this a portion of the lift gas passing through lift gas return line 57 is passed via line 125 controlled by valves 126 and 127 into cooler 128. The cooled gas and any condensate then passes via line 129 into separator 130 in which condensate is separated from the rich gas. The thus treated rich gas is then passed via line 131 controlled by valve 132 into lift gas return line 57 on a down stream side of valve 127 and a steam-free rich gas recycle for lifting the adsorbent results. Under these conditions, the stripper 32 is operated so that substantially all the stripping steam passing upwardly therethrough it adsorbed before reaching elutriation zone 11.

During operation, it is desirable to remove accumulations of high molecular weight constituents from the carbon such as are formed by polymerization of acetylene and the like or components such as normally liquid hydrocarbons present in the feed gas since these decrease the adsorptive capacity as activity of the carbon. To accomplish this about 5% or so of the carbon circulated is removed from transfer line 52 by means of line 62 controlled by valve 63 and is passed through a high temperature reactivator in which the carbon is contacted with steam while being heated to a temperature of from 500° F. to 2000° F. or higher. The desorbable materials are removed from the carbon at the lower reactivation temperatures and may be combined with the rich gas product. For desorption of high molecular weight constituents the reactivator operates at about 1000°–1100° F. which is just below the carbon gasification temperature. When the charcoal activity is lowered to less than a desirable value, the reactivator temperature is increased to 1700°–1800° F. for a sufficient period of time to restore the desired activity or adsorptive capacity of the charcoal and then returned to 1000°–1100° F. A preferential water gas reaction occurs at the higher temperatures whereby the high moleculr weight nondesorbable hydrocarbons are converted to carbon monoxide and hydrogen leaving the carbon in a reactivated state. It is then combined via line 64 controlled by valve 65 with carbon flowing via transfer line 40 into lift line 50.

The description of the apparatus of this invention and the process involved in separating a gaseous mixture thereby into four substantially pure fractions, including ethylene and propylene concentrates, may be more readily understood from the following description which is in the form of a practical example. Although the example is directed to the separation of hydrocarbon gases, the process is not to be considered as limited only to the separation of such gases since the description is merely an illustration of the operation whereby two rectified and substantially pure heart cut or side cut fractions are obtained.

EXAMPLE I

A selective adsorption column 12.0 feet in diameter and designed according to the accompanying drawing utilizes a circulation of activated vegetable charcoal amounting to 330,000 pounds per hour. The charcoal has a mesh size range of 12 to 20. The charcoal circulation is divided into two streams at zone 13 and 230,000 pounds per hour pass directly into secondary adsorption zone 15 for passage through the secondary separation zone and the remaining 100,000 pounds per hour pass downwardly through and independent of the secondary separation zone through conduit 66 for introduction into primary adsorption zone 25 and subsequently through the primary separation zone. The feed gas, a cracked petroleum hydrocarbon gas mixture flowing at a rate of 2141 pound mols per hour, has the following composition:

TABLE 1

*Feed gas composition*

| Constituent: | Mol per cent |
|---|---|
| Hydrogen | 17.86 |
| Methane | 40.11 |
| Ethylene | 9.15 |
| Ethane | 24.88 |
| Propylene | 2.42 |
| Propane | 4.13 |
| Butenes | 0.34 |
| Butanes | 0.65 |
| $C_5$'s | 0.21 |
| $C_6+$ | 0.25 |
| Total | 100.00 |

The feed gas is introduced at a pressure of 150 pounds per square inch gauge via line 67 at a rate of 2141 pound mols per hour controlled by valve 68 into feed gas engaging zone 26. It contacts 100,000 pounds per hour of activated carbon in primary adsorption zone 25 wherein the $C_3$ and higher molecular weight hydrocarbons are adsorbed together with a small proportion of $C_2$ and lower molecular weight hydrocarbons to form a rich charcoal. In primary adsorption zone 25 a $C_2$–$C_3$ separation is made in the presence of $C_1$ hydrocarbon which has been found to facilitate the separation by reducing the charcoal rate required. The $C_2$ and lower molecular weight constituents remain substantially unadsorbed as a secondary feed gas and are removed from secondary feed disengaging zone 24 and passed via line 69 controlled by valve 70 into secondary feed engaging zone 16 in the secondary separation section. The treatment of the rich charcoal formed in primary adsorption zone 25 will be subsequently described.

Valve 70 controlling the rate of secondary feed introduction is actuated by differential pressure controller 71 to maintain a constant differential pressure between disengaging zone 24 and engaging zone 16. The secondary feed, comprising substantially all the $C_2$ and lower molecular weight constituents, is countercurrently contacted by 230,000 pounds per hour of carbon in secondary adsorption zone 15. The $C_1$–$C_2$ hydrocarbon separation is effected here in the absence of the $C_3$ hydrocarbons which were adsorbed and removed from the gas stream during passage through primary adsorption zone 25.

The C₂ hydrocarbon fraction together with a small quantity of C₁ hydrocarbon is adsorbed in secondary adsorption zone 15 to form a second rich charcoal and the major proportion of hydrogen and C₁ hydrocarbon is substantially unadsorbed. This gas accumulates in lean gas disengaging zone 14 and a lean gas product stream is removed therefrom via line 72 at a rate controlled by valve 73 which in turn is actuated by temperature recorder controller 74 having thermocouple point 75 in contact with the adsorbent in zone 15. The lean gas product flows at a rate of 1241 pound mols per hour, is sent to storage or further processing facilities not shown by means of line 76, and has the composition given below:

TABLE 2

Lean gas product composition

| Constituent: | Mol per cent |
|---|---|
| Hydrogen | 30.81 |
| Methane | 69.03 |
| Ethylene | 0.06 |
| Ethane | 0.10 |
| Total | 100.00 |

If desired, a H₂–C₁ separation can be made in secondary adsorption zone 15 whereby the lean gas product comprises substantially pure hydrogen. Such a separation requires a somewhat higher charcoal rate in the secondary separation zone since the C₁ hydrocarbon is adsorbed along with the C₂ hydrocarbons from the hydrogen.

A portion of the unadsorbed gas passes upwardly from lean gas disengaging zone 14 as a purge gas through zone 13 and through the tubes of cooling zone 12 countercurrent to the downflowing adsorbent. Here the purge gas strip remaining traces of stripping gas from the adsorbent which is simultaneously saturated with lean gas and the heat of adsorption is dissipated as it is generated. This purge gas enters seal gas removal zone 100 wherein it mixes with a portion of the stripping gas entering from the heating and stripping zones above to form a seal gas. This is removed via line 106 and disposed of as described below.

The second rich charcoal formed in secondary adsorption zone 15 passes downwardly into first side cut rectification zone 17. Herein the charcoal is contacted with a reflux gas comprising substantially pure C₂ hydrocarbons. A preferential desorption of adsorbed C₁ hydrocarbon results, the desorbed C₁ hydrocarbon passing upwardly to combine with the lean gas product and a second partially rectified charcoal substantially free of C₁ and lower molecular weight constituents is formed. This charcoal passes downwardly into second side cut rectification zone 19 wherein the second partially rectified charcoal is contacted by a countercurrent flow of C₃ hydrocarbon reflux. The preferential desorption of C₂ hydrocarbons by the C₃ hydrocarbons is herein effected. Part of the C₂ hydrocarbons is employed as above described as the C₂ reflux in first side cut rectification zone 17 and are eventually removed with the remaining part of C₂ hydrocarbons from first side cut disengaging zone 18 via line 77 controlled by valve 78 in turn regulated by back pressure recorder controller 79. The first side cut gas product passes via line 77 at a rate of 730 pound mols per hour to further processing facilities or storage not shown and has the following composition:

TABLE 3

First side cut gas composition

| Constituent: | Mol per cent |
|---|---|
| Methane | 0.29 |
| Ethylene | 26.74 |
| Ethane | 72.77 |
| Propylene | 0.09 |
| Propane | 0.11 |
| Total | 100.00 |

The charcoal in second side cut rectification zone 19, from which the C₂ hydrocarbons have been desorbed and which contain only C₃ hydrocarbons substantially uncontaminated by higher or lower molecular weight constituents, passes downwardly into second side cut desorption zone 21. A primary reflux gas containing C₃ and C₄+ hydrocarbon constituents formed in secondary rectification zone 29, as hereinbelow more fully described, passes via line 80 at a rate controlled by valve 81 and actuated by temperature recorder controller 82 into primary reflux gas engaging zone 22. This gas passes upwardly countercurrent to the partially rectified charcoal present in second side cut desorption zone 21 to preferentially desorb the C₃ constituents while adsorbing the C₄+ hydrocarbon constituents. The thus desorbed C₃'s are partially employed as the aforementioned C₃ reflux in second side cut rectification zone 19 and the remainder is removed from second side cut disengaging zone 20 via line 83 at a rate controlled by valve 84 and temperature recorder controller 85 at a rate of 140 pound mols per hour. This second side cut gas product has the following composition:

TABLE 4

Second side cut gas composition

| Constituent: | Mol per cent |
|---|---|
| Ethylene | 0.07 |
| Ethane | 0.13 |
| Propylene | 36.66 |
| Propane | 62.64 |
| Butenes | 0.20 |
| Butanes | 0.30 |
| Total | 100.00 |

The second rectified charcoal, substantially saturated with C₄ and higher molecular weight hydrocarbons are substantially free of C₃ hydrocarbons, passes downwardly through primary reflux gas engaging zone 22, through and independent of the primary separation zone via conduits 86, and into secondary rectification zone 29 wherein it is combined with charcoal flowing through primary reflux gas disengaging zone 28 from the primary separation zone.

The rich charcoal present in primary adsorption zone 25 contains C₃ and higher molecular weight hydrocarbons together with a small proportion of C₂ and lighter constituents. It passes into primary rectification zone 27 wherein the charcoal is contacted by a countercurrent flow of part of the aforementioned primary reflux gas. The C₂ and lighter molecular weight constituents are preferentially desorbed to form a first partially rectified charcoal. This charcoal is combined with that removed from the bottom of the secondary separation zone and introduced directly into secondary rectification zone 29. Herein the partially rectified carbon is contacted with a countercurrent flow of rich gas reflux containing C₄ and higher molecular weight hydrocarbons. A preferential desorption of substantially all of the $C_3$ hydrocarbons is effected forming a gas containing $C_3$ hydrocarbons as the lowest molecular weight constituents and also containing some $C_4$ and higher molecular weight constituents. This gas is the primary reflux gas and is introduced via line 80 into zone 22 as above described.

The rectified charcoal removed from the bottom of secondary rectification zone 29 passes through rich gas disengaging zone 30 and ultimately through feeder 34 into bottom zone 35. This rich adsorbent is removed via transfer line 40 and is conveyed by means of a rich gas lift medium to the top of the column for recirculation therethrough in the manner described above.

The rectified charcoal is thus introduced into preferential desorption zone 31. Herein the rectified charcoal is contacted with a countercurrent flow of steam which is preferentially adsorbed at the temperature of the carbon causing an immediate desorption of the major proportion of the $C_4$ hydrocarbon constituents as well as a partial desorption of the higher molecular weight constituents leaving a partially stripped charcoal. The thus desorbed gases pass upwardly into elutriation zone 11 from which they are removed for recirculation as the lift gas as above described. The constituents thus desorbed form the rich gas product which may be conveyed via line 58 to condenser 90 but preferably are passed via line 101 from the lift gas recycle stream through the bottom of the column to rich gas disengaging zone 30. The desorbed gases are partly introduced into secondary rectification zone 29 as reflux to be preferentially adsorbed therein while the remainder is removed via line 87 controlled by valve 88 which in turn is actuated by temperature recorder controller 89. The rich gas is introduced into cooler 90 wherein the stripping steam is condensed. The condensate is separated from the cooled rich gas in separator 91 from which it is removed via line 92 controlled by valve 93 under action of liquid level controller 94. The rich gas product from which the major proportion of stripping gas has been removed passes from separator 91 via line 95 controlled by valve 96.

The partially stripped charcoal, saturated with stripping steam, passes from preferential desorption zone 31 downwardly through the tubes of indirect heater 32 through which an upward flow of stripping gas is maintained. Stripping steam is introduced into stripping gas engaging zone 33 via line 103 controlled by valve 104, a portion of which passes downwardly concurrently with the charcoal into seal gas removal zone 100 while the major proportion passes upwardly through the tubes of indirect heater 32 to be mostly adsorbed in zone 31. The temperature to which the carbon is heated during passage through stripper 32 is between 500° F. and 600° F. Here substantially all of the adsorbed $C_4$ hydrocarbons are removed from the adsorbent and are ultimately combined with the rich gas product.

These temperatures are insufficient to remove adsorbed $C_5$ and $C_6$ hydrocarbons adsorbed on the carbon. To effect the removal of these higher molecular weight hydrocarbons and to reactivate the carbon by removing traces of nondesorbable constituents, a small portion of the circulating charcoal stream is conveyed via line 62 and 64 through a reactivator, not shown, but described above. The steam plus desorbed hydrocarbons are removed from the reactivator at about 1000° F. and are passed through a cooler in much the same way as the rich gas removed from the stripper 32. Hydrocarbon constituents are thus separated from the stripping gas by condensation and/or decantation and are combined with the rich gas removed via line 95 from separator 91. The combination of the thus desorbed higher molecular weight hydrocarbons comprises the rich gas product in this particular operation. These constituents are produced at the rate of 30 pound mols per hour and have the following composition:

TABLE 5

*Rich gas product composition*

| Constituent: | Mol per cent |
|---|---|
| $C_3$'s | 0.20 |
| $C_4$'s | 66.74 |
| $C_5$'s | 15.18 |
| $C_6+$ | 17.88 |
| Total | 100.00 |

Seal gas removal zone 100 is provided with a series of tubes 105 through which the adsorbent flows. The purpose of these tubes is to provide a resistance to the flow of stripping gas so that the major proportion thereof will pass upwardly into heating zone 32. The flow of the minor proportion of stripping gas downwardly through tubes 105 prevents the upward flow of purge gas into heating zone 32 which would otherwise contaminate the rich gas product. A mixture of stripping gas and purge gas thus formed comprises the seal gas and is removed from zone 100 via line 106 controlled by valve 107 which passes through cooler 108 and subsequently into separator 109. Herein the stripping gas is condensed and the purge gas constituents are removed via line 110 controlled by valve 111 and may subsequently be combined with the lean gas by introduction through line 60. The condensed stripping steam is removed from separator 109 via line 112 controlled by valve 113 which is actuated by level controller 114.

From seal gas removal zone 100 the hot stripped adsorbent passes directly into cooler 112 wherein the adsorbent is cooled indirectly in the presence of a countercurrent flow of purge gas which strips remaining traces of adsorbed steam from the adsorbent.

The cool lean adsorbent thus formed is introduced through zone 13 directly into the separation zone which is described above.

The lean gas product contains only 0.16% impurities and comprises 99.84% of a mixture of hydrogen and methane. The first side cut is a 99.51% pure $C_2$ hydrocarbon consisting approximately of 25% ethylene and 75% ethane. The second side cut comprises a 99.30% pure $C_3$ hydrocarbon fraction containing over 30% propylene. The unusually high purity of these fractions is attributed to the manner in which they are separated from the feed gas, the separation of $C_1$ from $C_2$ hydrocarbon in the absence of $C_3$ hydrocarbons, the separation of $C_2$ and $C_3$ hydrocarbons in the absence of $C_1$ hydrocarbon, and the utilization of a rich gas product as the lifting medium.

EXAMPLE II

As an example of previous operation in the separation of this gaseous mixture wherein the $C_3$ and $C_4$ hydrocarbons are separated as a rich gas, the $C_2$ hydrocarbons are separated as a single side cut gas and the methane and hydrogen are separated as a lean gas product, a charcoal rate of between 360,000 and 370,000 pounds per hour is required. Further between 25% and 30% more lift gas circulation is required in lifting the same amount of charcoal with hot lift gas compared to the process of the present invention. Thus the improved separation by means of the process above described is at once apparent.

The foregoing examples have shown the use of a separation zone which is complex in arrangement to permit the production of four substantially pure fractions. However, the process of this invention may be modified to effect simplification of the separation zone whereby two or only three products are prepared from the gaseous mixture.

EXAMPLE III

In one modification of the separation zone a single stream of adsorbent is employed which passes successively through one adsorption zone and one rectification zone. In this instance the feed gas may be introduced via line 67 into primary adsorption zone 25 and with valve 70 closed, the lean gas is removed via line 115 controlled by valve 116. With valve 81 closed zones 27 and 29 comprise a single rectification zone wherein the rich adsorbent is rectified to free it of less readily adsorbable constituents. The rectified adsorbent is subsequently treated as above described to produce a rich gas product therefrom. In this modification the entire upper portion of the separation zone is not used and valves 25, 70, 73, 78, 81, 84, 118 and 120 are closed. Valves may be also provided in lines 86 to prevent movement of adsorbent through the secondary separation zone. The rich gas product is employed for adsorbent conveyance.

EXAMPLE IV

A similar operation may be carried out in the upper portion of the column separately or simultaneously with the operation described in Example III by introducing a feed gas, which may be different or the same as the feed gas introduced below in the primary separation zone described in Example III, via line 117 controlled by valve 118 into engaging zone 16. A lean gas is removed as in Example I from zone 14 and the rich adsorbent subsequently passes into zone 17 for rectification or directly through zones 17, 19, and 21 into primary rectification zone 29. Thus in the apparatus shown on the drawing two simultaneous simple separations may be made. This modification is particularly adaptable to the separation of two gases containing the same more readily adsorbable constituents so that from the two feed gases, one rich gas product is prepared and two or more lighter lean gas products.

EXAMPLE V

In addition to the simple separation, where two products only are produced, provision may be made in the secondary separation zone for the production of one or more side cut products. In this case the feed gas is introduced via line 117, the lean gas is removed as before via line 72, the rich adsorbent is rectified with a side cut gas reflux in zone 17, rich gas reflux is introduced via line 80 into zones 19 and 21 which act in this modification as a single rectification zone wherein valve 84 is closed, the side cut gas constituents are desorbed and removed via line 77, and the rectified adsorbent passes via lines 86 into primary rectification zone 29. From here the rich rectified adsorbent passes into the heating zone and the rich gas product is desorbed. In this modification a feed gas introduced into the secondary separation zone is separated into two fractions in addition to the rich gas product. It is of interest to note that this side cut operation may be carried on simultaneously with a simple separation of feed introduced via line 67 into the primary separation zone. Thus two feed gases may be processed simultaneously in a single column permitting unusual flexibility of operation in the separation of feed gases having compositions which vary with time.

EXAMPLE VI

Another modification of the separation zone permits the production of a single rectified side cut in addition to the lean gas and rich gas products. In this modification the feed gas enters zone 16 via line 117 and contacts one stream of adsorbent flowing through secondary separation zone and a lean gas product is produced via line 72. Valves 68, 70, 78, 81, 84 and 120 are closed. The rich adsorbent thus formed passes via lines 86 into rectification zone 29 wherein it is contacted with a rich gas reflux and constituents present in the side cut gas are thereby desorbed. Zones 25 and 27 are in this case a single rectification zone, zones 17, 19, and 21 are not used, and the rectified side cut is removed via line 115 controlled by valve 116. Thus the feed gas is contacted with a first portion of the adsorbent and a second portion of adsorbent is employed to adsorb the more readily adsorbable constituents from a gas desorbed from the combined stream of adsorbent leaving a rectified side cut from which both less readily and more readily adsorbable constituents have been substantially completely removed.

EXAMPLE VII

In a further modificaton of the separation zone two individual streams of adsorbent are employed as in Example VI except that a primary and a secondary reflux gas are employed. The feed gas is introduced via line 117 into zone 16 to contact a first adsorbent stream. The lean gas product is removed via line 72. Valves 78 and 84 are closed making zones 17, 19 and 21 a single rectification zone into which a primary reflux is introducted via line 80. The combined adsorbent is treated in zone 29 by a rich gas reflux from which the primary reflux is desorbed. Valves 68 and 116 are closed and part of the primary reflux passes into zone 27 to contact the second adsorbent stream wherein the side cut gas is desorbed and more readily adsorbable constituents are adsorbed. The side cut gas product is partly introduced into zone 25 wherein a secondary reflux gas is desorbed and which is conveyed via line 69 to the feed gas inlet in line 117 while the remainder of the side cut gas product passes via line 119 controlled by valve 120 to production.

In each of the foregoing examples the same manner of treating the rich adsorbent to desorb the more readily adsorbable constituents is employed and a portion of the thus desorbed rich gas constituents is employed for conveying the cool rich adsorbent saturated with more readily adsorbable constituents from the bottom to the top of the column. Thus, in the described modifications of the present invention a material advantage results in the utilization of a portion of the rich gas product as the lift gas. The lift gas thus employed is cool and has a higher density and a higher viscosity than any gas product removed as a product from the gaseous mixture being separated. This increases the lifting properties of the lift gas permitting lower velocities of gas in lift line 50, decreased charcoal attrition rates, and increased charcoal-lift gas ratios as well as materially simplifying the construction of the lift line and lift gas blowing apparatus. Thus, in all the described modifications of the separation zone the same advantages are realized which are due to employing a rich gas lift medium and to operating the heating, sealing and cooling zones in sequence within the column as described. The variation in the separation zone enables a gaseous feed mixture to be separated into a number of different fractions.

It is to be understood, however, that the specific separations of hydrocarbon gas mixtures used in the previous example, is used here only in the purposes of clear description and that this invention of an improved apparatus and process for the separation by selective adsorption of gaseous mixtures applies equally well to other hydrocarbon or nonhydrocarbon gaseous mixtures.

For application to the selective adsorption process as herein described, granular adsorbents ranging from 12 to 20 mesh in size is preferred. However, other ranges of particle size such as from 10-30 are applicable. In some specific applications, granules as large as about two mesh are applicable and in certain other specific instances powdered adsorbents may be applied having small granules as fine as about 100 mesh or finer. Of the various adsorbents which are applicable for use in the selective adsorption process as herein described, it is preferable to employ activated granular charcoal and particularly an activated vegetable charcoal with granules of from 12 to 20 mesh in size. Other adsorbents such as silica gel, activated aluminum oxide, activated bauxite, animal and mineral carbons, and various adsorbents prepared from iron and chromium oxides, and others are applicable.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture which comprises contacting said gaseous mixture in an adsorption zone with a moving bed of solid granular adsorbent forming a rich adsorbent containing the more readily adsorbable constituents and leaving a substantially unadsorbed lean gas containing the less readily adsorbable constituents, contacting said rich adsorbent with a rich gas reflux to desorb less readily adsorbable constituents therefrom forming a rectified adsorbent, conveying said rectified adsorbent in a lift gas comprising constituents of said rich gas to a heating zone, heating said rich adsorbent and stripping the remaining rich gas constituents therefrom forming a lean adsorbent, cooling said lean adsorbent and passing the same into said adsorption zone to contact further quantities of said gaseous mixture.

2. In a continuous adsorption process in which a substantially compact moving bed of adsorbent is circulated through a column, a feed gas is contacted with said adsorbent thereby adsorbing more readily adsorbable constituents forming a rich adsorbent, the adsorbed constituents are desorbed from said rich adsorbent as a rich gas product and the lean adsorbent remaining is recirculated to contact further quantities of said gaseous mixture, the improvement which comprises removing rectified adsorbent from the bottom of said column after passage through a rectification zone, contacting said rectified adsorbent with a rich gas whereby said adsorbent is conveyed to the top of said column, introducing the thus conveyed adsorbent into a heating zone to strip remaining rich gas constituents therefrom, recirculating said adsorbent to contact further quantities of said gaseous mixture and recirculating a portion of said rich gas to convey further quantities of said rectified adsorbent.

3. A process according to claim 2 wherein said rich gas employed in conveying said rectified adsorbent comprises a gas consisting essentially of constituents which are the most readily adsorbable constituents in said gaseous mixture.

4. A process according to claim 2 wherein a portion of said adsorbent circulating through said column is separated and passed through a reactivation zone, residual adsorbed constituents are removed from the adsorbent raising its adsorptive activity and the reactivated adsorbent is returned to the recirculating stream of adsorbent.

5. A process according to claim 2 in combination with the steps of separating a portion of adsorbent from the main stream recirculating through said column, passing this portion through a reactivation zone, heating the adsorbent during passage therethrough to reactivation temperatures to remove residual adsorbed materials forming a reactivated adsorbent and returning the reactivated portion to the main recirculating adsorbent stream.

6. A process according to claim 5 wherein the adsorbent comprises activated charcoal, said reactivation temperatures lie between about 500° F. and 2000° F. and said reactivation is conducted in the presence of steam.

7. A process according to claim 6 wherein the temperature of said reactivation is alternately maintained between about 500° F. and 1100° F. to strip adsorbed constituents from the reactivating charcoal and between about 1000° F. and 2000° F. to convert nondesorbable constituents to carbon monoxide and hydrogen to maintain the adsorbent in a reactivated state.

8. In a gas separation process wherein a moving bed of solid granular adsorbent is passed downwardly by gravity through a vertical column containing a desorption zone, a sealing zone, a cooling zone and an adsorption zone, the gaseous mixture to be separated is passed countercurrently through said adsorption zone to form a rich adsorbent and an unadsorbed lean gas, said rich adsorbent is subsequently indirectly heated in said desorption zone in the presence of a stripping gas to remove adsorbed constituents leaving a hot lean adsorbent, and the hot lean adsorbent is cooled prior to being reintroduced into said adsorption zone, the improvement which comprises passing said hot lean absorbent concurrently with part of said stripping gas from said desorption zone through said sealing zone, subsequently passing the adsorbent through a cooling zone countercurrent to part of said lean gas to form a cool lean adsorbent, removing said part of said stripping gas and said part of lean gas as a seal gas from said sealing zone, passing said cool lean adsorbent through said adsorption zone, contacting said adsorbent with said gaseous mixture to form a rich adsorbent, contacting said rich adsorbent with a stripping gas to desorb part of the more readily adsorbable constituents thereby forming a partially stripped adsorbent, contacting said partially stripped adsorbent with a rich gas containing the more readily adsorbable constituents of said gaseous mixture, and thereby conveying said partially stripped adsorbent to the top of said column for passage through said heating zone and the subsequent zones named.

9. In a gas separation process wherein a gaseous mixture is contacted with a moving bed of solid granular adsorbent leaving an unadsorbed lean gas and forming a rich adsorbent, the rich adsorbent is heated in the presence of a stripping gas forming a rich gas product and a hot lean adsorbent, the hot lean adsorbent is cooled in the presence of a portion of said lean gas, and the cool lean adsorbent is employed to contact further quantities of said gaseous mixture, the improvement which comprises passing a moving bed of adsorbent by gravity through a vertical column containing a heating zone, a seal gas removal zone, a cooling zone, a separation zone and a rectification zone, removing a portion of said stripping gas and a portion of said lean gas as a seal gas from said seal gas removal zone, removing rectified adsorbent from said rectification zone at the bottom of said column, and conveying the rectified adsorbent therefrom to the top of said column as a suspension in a portion of said rich gas product as a lift gas which contains the constituents of said gaseous mixture having the higher degrees of adsorbability.

10. In a process for separating a gaseous mixture by selective adsorption of more readily adsorbable constituents on a solid granular adsorbent leaving less readily adsorbable constituents as a substantially unadsorbed lean gas, recovering adsorbed constituents as a rich gas from said adsorbent, and employing the adsorbent in a vertical column as a recirculating moving bed, the improvement which comprises passing the adsorbent successively by gravity through a preferential desorption zone, a heating zone, a sealing gas removal zone, a cooling zone and a separation zone immediately prior to removing said adsorbent from said column, passing part of a stripping gas from said heating zone concurrently with said adsorbent into said seal gas removal zone, passing part of said lean gas countercurrent to said adsorbent through said cooling zone into said seal gas removal zone, removing the seal gas mixture thus formed from said seal gas removal zone, and conveying the adsorbent removed from said separation zone to said preferential desorption zone in the presence of a portion of the rich gas product and part of said stripping gas.

11. A process for separating a gaseous mixture which comprises passing a moving bed of adsorbent by gravity through a vertical column provided at successively lower levels therein with a preferential desorption zone, a heating zone, a sealing gas removal zone, a cooling zone and a separation zone, recirculating said adsorbent removed from said separation zone into said preferential desorption zone, introducing said gaseous mixture into said separation zone, removing a lean gas from said separation zone, passing part of said lean gas upwardly through said cooling zone as a purge gas, introducing a stripping gas into said column below said heating zone, removing a rich gas containing said stripping gas from a point above said preferential desorption zone, introducing part of the thus removed gas into the bottom of said column for passage through further quantities of adsorbent, removing rich gas from the bottom of said separation zone, and employing the remaining part of said rich gas product as a lift gas for conveying adsorbent removed from the bottom of said column to the top thereof.

12. A process according to claim 11 wherein said adsorbent comprises activated vegetable charcoal, said stripping gas comprises steam, and wherein said rich gas desorbed from said preferential desorption zone is treated for the removal of stripping gas prior to its employment as lift gas.

13. A process according to claim 11 wherein said adsorbent removed from said separation zone is suspended in an upwardly flowing stream of rich gas product, the suspension thus formed is subsequently separated in a separation zone, the thus conveyed adsorbent gravitates into said preferential desorption zone and the lift gas is recirculated to suspend further quantities of partially stripped adsorbent.

14. In a continuous process for separation of a gaseous mixture by flowing a moving bed of granular adsorbent by gravity through a vertical column, conveying adsorbent removed from the bottom of said column to the top thereof, contacting part of said moving bed with said gaseous mixture to form a rich adsorbent, subsequently heating and stripping adsorbed constituents from said rich adsorbent forming a rich gas and a hot lean adsorbent, then cooling said hot adsorbent prior to contacting further quantities of said gaseous mixture, the improvement which comprises flowing said moving bed of adsorbent by gravity through said column containing a preferential desorption zone, a heating zone, a seal gas removal zone, a cooling zone, and an adsorption zone in succession, passing a stripping gas through said heating zone to desorb a rich gas, passing a purge gas through said cooling zone, removing all of said purge gas and at least part of said stripping gas as a seal gas from said seal gas removal zone, and conveying adsorbent removed from the bottom of said column to said preferential desorption zone in the top of said column in the presence of a lift gas consisting essentially of a portion of said rich gas desorbed from the partially stripped adsorbent present in said preferential desorption zone.

15. A process for separating a gaseous mixture which comprises flowing a moving bed of granular adsorbent successively through a preferential desorption zone, a heating zone, a seal gas removal zone, a cooling zone, an adsorption zone, and a rectification zone by gravity and then through a conveyance zone back to said preferential desorption zone, passing said gaseous mixture through said adsorption zone forming a rich adsorbent and a substantially unadsorbed lean gas, subsequently contacting said rich adsorbent in said rectification zone with a first portion of a rich gas product containing constituents of higher adsorbability forming a rectified adsorbent, contacting said rectified adsorbent with a second portion of said rich gas product thereby conveying said rectified adsorbent from said rectification zone to said preferential desorption zone, contacting said rectified adsorbent therein with a preferentially adsorbed stripping gas thereby desorbing a rich gas product leaving a partially stripped adsorbent, heating said partially stripped adsorbent indirectly in said heating zone in the presence of a stripping gas to desorb remaining rich gas constituents leaving a hot lean adsorbent, dividing the thus desorbed rich gas into said first and second portions and removing the remainder as a product, subsequently flowing said lean adsorbent successively through said seal gas removal zone and said cooling zone, passing a portion of said lean gas as a purge gas through said cooling zone in direct countercurrent contact with said adsorbent into said seal gas removal zone, passing a portion of said stripping gas from said heating zone into said seal gas removal zone to combine with said purge gas and form a seal gas, removing said seal gas from said seal gas removal zone, separating stripping gas therefrom, and combining the purge gas constituents remaining with said lean gas.

16. A process for separating a gaseous mixture which comprises passing a substantially compact moving bed of solid granular adsorbent by gravity successively through a desorption zone, a seal gas removal zone, a cooling zone and a separation zone containing an adsorption zone, recirculating adsorbent removed from said separation zone to said desorption zone in the presence of the more readily adsorbable constituents of said gaseous mixture, passing said gaseous mixture through said adsorption zone forming a rich adsorbent and a substantially unadsorbed lean gas, heating said rich adsorbent in said desorption zone while contacting the heated rich adsorbent with a countercurrent flow of stripping gas to desorb a rich gas therefrom leaving a lean adsorbent, passing said lean adsorbent through said seal gas removal zone and through said cooling zone, passing a portion of said lean gas through said cooling zone countercurrent to said adsorbent, passing a portion of said stripping gas from said desorption zone concurrently with said adsorbent into said seal gas removal zone, combining said portion of lean gas with said portion of stripping gas in said seal gas removal zone to form said seal gas, and removing said seal gas therefrom.

17. A process according to claim 16 wherein said moving bed of solid granular adsorbent comprises activated vegetable charcoal.

18. A process according to claim 16 wherein said stripping gas comprises steam.

19. A process according to claim 16 wherein said separation zone comprises an adsorption zone and at least one rectification zone.

20. A process according to claim 16 wherein said adsorbent passing through said cooling zone into said separation zone is divided into a first and a second separate stream for passage through said separation zone as independent substantially compact moving beds, and said streams of adsorbent are withdrawn from said separation zone and combined prior to being removed from the bottom of said column.

21. A process according to claim 20 wherein said gaseous mixture is contacted with said first stream of adsorbent leaving an unadsorbed secondary feed gas, subsequently contacting said secondary feed gas with said second stream of adsorbent, removing a lean gas product from said second stream, and desorbing remaining adsorbed constituents as a rich gas product from the combined adsorbent streams.

22. A process according to claim 20 wherein said gaseous mixture is contacted with said second stream of adsorbent leaving an unadsorbed lean gas product, desorbing a primary reflux gas containing constituents of intermediate adsorbability from the combined adsorbent streams, contacting said first stream with a part of said primary gas reflux to form a side cut gas product, and desorbing a rich gas product from the combined adsorbent streams.

23. A process according to claim 20 wherein said gaseous mixture is contacted with said second stream of adsorbent leaving an unadsorbed lean gas product, a primary reflux gas containing constituents of intermediate adsorbability is desorbed from the combined streams of adsorbent, said first stream is first contacted with a side cut gas reflux to desorb a secondary reflux gas, said second stream of adsorbent is contacted with said secondary reflux gas, said first stream is subsequently contacted with a part of said primary gas reflux to form a side cut gas product, and a rich gas product is desorbed from the combined adsorbent streams.

24. A process according to claim 20 wherein said first and second streams of granular adsorbent are contacted in said separation zone with separate streams of gaseous mixtures to be separated and said gaseous mixtures both contain more readily adsorbable constituents to be produced as a single rich gas product.

25. A process according to claim 20 wherein said gaseous mixture is contacted with said first stream of adsorbent leaving an unadsorbed gas, subsequently contacting said unadsorbed gas with said second stream of adsorbent, removing a lean gas product from said second stream, subsequently desorbing at least one side cut gas product from said second stream of adsorbent, and desorbing remaining adsorbed constituents as a rich gas product from the combined first and second streams of adsorbent.

26. A process according to claim 20 wherein said gaseous mixture is contacted with said first stream of adsorbent leaving an unadsorbed gas, subsequently contacting said unadsorbed gas with said second stream of adsorbent, removing a lean gas product comprising the less readily adsorbable constituents of said gaseous mixture from siad second stream, subsequently contacting said second stream with a second side cut gas reflux to desorb a first side cut gas product, subsequently contacting said second stream with a portion of said primary reflux gas to desorb said second side cut gas and desorbing remaining adsorbed constituents as a rich gas product therefrom from the combined first and second streams of adsorbent.

27. A process according to claim 26 wherein said first and second streams of adsorbent are each contacted with a portion of said primary reflux gas prior to being combined into a single stream of adsorbent.

28. An apparatus for separating a gaseous mixture which comprises a substantially vertical column provided at successively lower levels therein with a preferential desorption section, a heating section, a seal gas removal section, a cooling section, a separation section and a secondary rectification section at the bottom of said column, means for introducing a gaseous mixture into said separation section, means for removing a substantially unadsorbed lean gas product from said separation section, means for introducing a stripping gas into said heating section, means for passing a purge gas from said separation section through said cooling section into said seal gas removal section, means for removing said purge gas and part of said stripping gas as a seal gas from said seal gas removal zone, means for removing more readily adsorbable constituents as a rich gas product from said preferential desorption section, means for recirculating at least a portion of said rich gas product desorbed in said preferential desorption zone by said stripping gas from the top of said column to the bottom thereof, and means for conveying rectified adsorbent removed from the bottom of said column to the top thereof in the presence of said rich gas product.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,825,707 | Wagner, Jr. | Oct. 6, 1931 |
| 1,836,301 | Bechthold | Dec. 15, 1931 |
| 2,351,214 | Kaufman et al. | June 13, 1944 |
| 2,379,195 | Simpson et al. | June 26, 1945 |
| 2,384,311 | Kearby | Sept. 4, 1945 |